Figure 1:
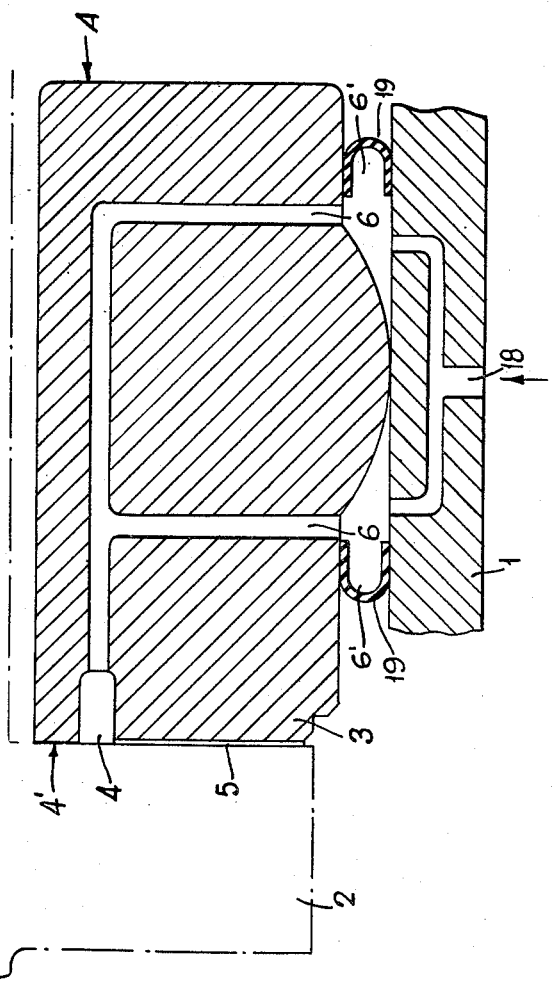

INVENTORS
THOMAS EDWARD ADAMS
BY
Lawson and Taylor

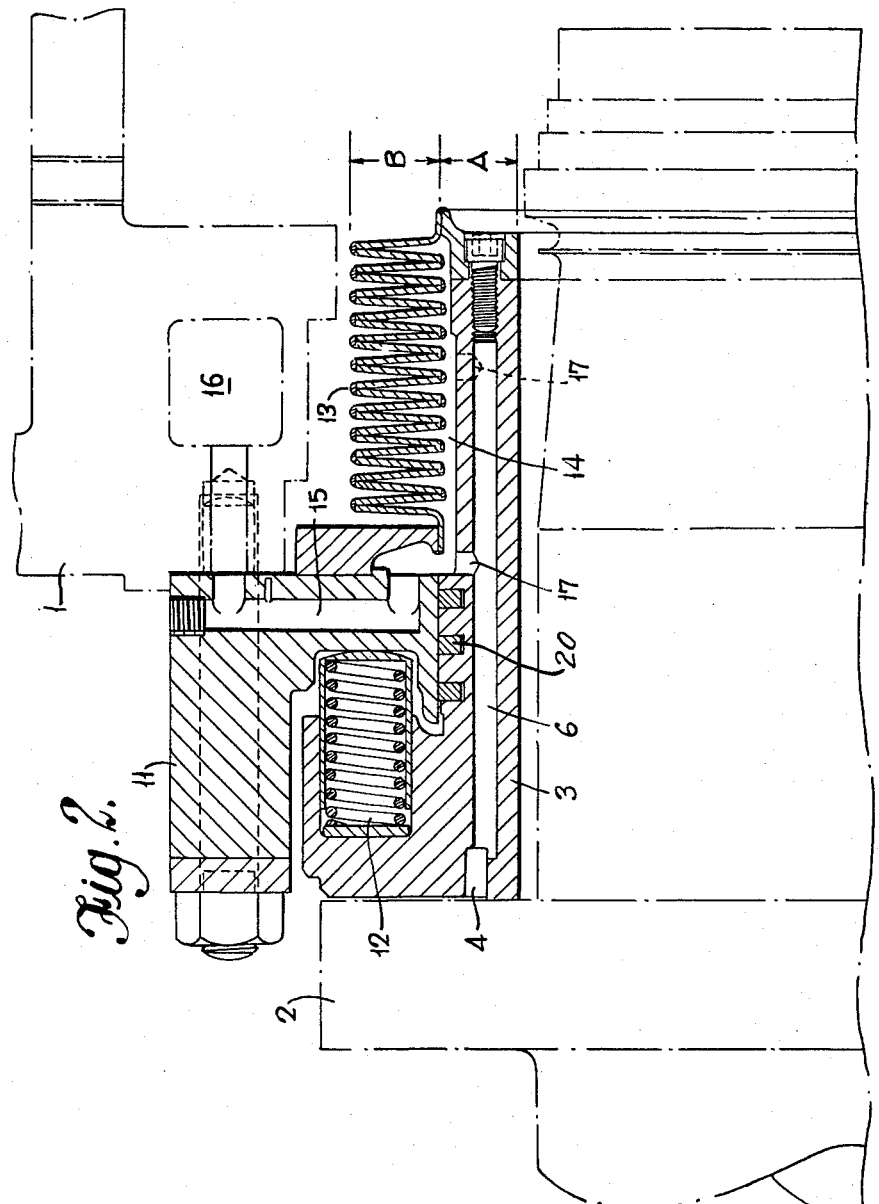

United States Patent Office 3,170,700
Patented Feb. 23, 1965

3,170,700
OIL SEAL FOR A ROTATABLE SHAFT EXTENDING INTO A GAS ENCLOSURE
Thomas Edward Adams, Rugby, England, assignor to Associated Electrical Industries Limited, London, England, a British company
Filed Mar. 28, 1960, Ser. No. 18,010
Claims priority, application Great Britain, Apr. 2, 1959, 11,276/59
1 Claim. (Cl. 277—3)

This invention relates to a gas seal for a rotatable shaft passing through a stationary bushing in the wall of a casing containing gas under high pressure, of the kind comprising a radial face on the shaft which bears against a co-operating face on the outer end of the bushing and passageways through the bushing for supplying oil to a space between the said faces at a pressure higher than that of the gas to provide a sealing oil film upon relative rotation between the shaft and the bushing. The invention is particularly applicable to gas-filled electric motors and gas blowers.

In a conventional seal of this kind the shaft carries a flange providing a surface normal to the axis of rotation which bears against the end face of a bushing which passes through the casing wall around the shaft. The bushing is non-rotatably mounted in the wall and is herein referred to as a stationary member though it has a slight degree of longitudinal freedom and is biased against the shaft flange. In the outer face of the stationary member there is an annular channel to which oil at a pressure slightly above that of the internal gas pressure is supplied through passageways in the bushing. In the bearing face of the bushing radial slots are formed which extend from the annular channel to the exterior periphery of the bushing. Between the channel and the internal periphery the bearing surfaces of the rotating flange and the stationary bushing or member are normally in contact over their whole area, whereas between the channel and the exterior periphery these surfaces are in contact only over the lands which exist between the radial slots.

In operation oil is forced through the radial slots and, due to the relative rotation of the two surfaces some of the oil is carried between the radial interslot faces; this produces a small separation of the surfaces with an oil film between them preventing leakage of gas to the atmosphere. This separation appears also between the inner radial surfaces effecting the seal and there will therefore be a small flow of oil through the seal into the gas chamber, the quantity depending upon the accuracy with which the separation of the surfaces can be maintained.

A known construction of seal of the aforesaid kind is diagrammatically illustrated in FIG. 1 of the accompanying drawings. FIGURE 2 of the drawings illustrates a sectional view of a high pressure seal constructed in accordance with the principles of the present invention. The shaft as illustrated by FIGURE 1 represented by chain-dot lines, projects through an opening in the wall portion 1 of a casing containing gas under pressure (for example a motor casing) and is provided with a flange 2 which is in contact with the end surface of a bushing 3 (the stationary member) surrounding the shaft and mounted in the wall portion 1 with a small degree of longitudinal freedom. The bushing is provided with an annular channel 4 and a number of slots 5 which extend radially from the channel to the outer periphery of the bushing. To prevent leakage to atmosphere of gas under pressure which is contained in the casing in the vicinity of the shaft, oil is fed to the channel 4 through passages 6 in the bushing 3 from annular chambers 6' between the bushing and wall portion 1 which communicates with an oil inlet 18. To complete the chambers 6', flexible sealing members 19 of rubber or neoprene are provided to form barriers between the bushing and wall portion, and these allow the bushing to have some degree of longitudinal freedom. The flange 2 and bushing 3 are in contact over the radial surface 4 between the channel 4 and the internal periphery of the bushing.

With a construction such as illustrated in FIG. 1, it will be evident that the total gas force exerted on the contacting surfaces will be equal to the gas pressure around the shaft multiplied by the area of the surface A. This force, particularly in the case of large machines, will be considerable and it is an object of this invention to reduce this force for any given size of seal.

According to this invention a shaft seal of the kind aforesaid comprises a bellows which encloses the inner end of the bushing within the gas-containing casing; the bellows is secured at one end to the casing wall, and at the other end to the bushing, the chamber thus formed within the bellows being connected through the casing wall with an oil source and through passages in the bushing to the space between the shaft and the outer face of the bushing.

A shaft seal in which the invention is incorporated is illustrated in FIG. 2 of the drawings. The shaft projects through the wall of the casing 1 and carries a flange 2 in contact with the outer end surface of the bushing 3 which is provided with an annular oil channel 4, similar to FIG. 1. The bushing is slidably carried in a mounting 11 which is secured to the wall portion 1 around the opening therein and is biased against the flange 2 by springs 12 located in recesses in the parts 3 and 11. Piston rings 20 provide an oil-tight sliding connection between mounting 11 and bushing 3.

The inner end of the bushing 3 is enclosed by a bellows 13 one end of which is secured to the bushing and the other end to the inner face of the mounting 11. The bellows thus permits the bushing to have a degree of longitudinal freedom and provides a chamber 14 around the bushing. Oil passages 15 are provided in the mounting 11 through which oil may be supplied from a source 16 to the chamber 14 which is in communication through ports 17 with the passages 6 leading to the channel 4.

In operation oil is fed from the source 16 at a pressure above that of the gas pressure within the casing. In a typical case the gas pressure may be about 120 lbs. per square inch and the oil pressure of the order of 130 lbs. per square inch. It will be appreciated that there will be an internal pressure on the bellows 13 due to the oil, and that the force on the annulus B occupied by the bellows will be the difference between the force due to the gas and that due to the oil; since the pressure of the latter is the higher, the resultant force will be small, but in a direction tending to move the bushing to the right and to separate the contacting surfaces of the flange 2 and the bushing. The force in the opposite direction will be that due to the gas pressure in the casing acting on the area of the annular end surface A.

It will be clear that in the construction according to the invention the resultant force on the contacting surfaces will be considerably less than in the previous arrangement as shown in FIG. 1, firstly because the area on which the gas pressure is acting is smaller, and also because there is a small opposing force due to the action of the oil pressure on the inside of the bellows.

In accordance with usual practice one of the contact faces of the shaft seal is made of soft white metal and the other is of hard metal. Preferably as described in our co-pending application Ser. No. 18,062, filed March 28, 1960, now abandoned, the member provided with radial slots is made of hard metal, and the lands between slots are tapered as viewed in the radial direction.

What I claim is:

An oil seal for a rotatable shaft comprising in combination a casing adapted to contain gas under pressure, a member secured to said casing and providing an opening through which said shaft extends, a flange on said shaft having a radially extending face directed towards the interior of said casing, a non-rotatable bushing surrounding said shaft and provided with an end face adjacent to and facing said face of said flange, piston ring sealing means located between said bushing and said member and affording a sliding connection therebetween, a flexible bellows surrounding said shaft and said bushing at the side of said piston ring sealing means away from the faces of said bushing and said flange, said bellows being connected at one end to said member and at the other end to said non-rotatable bushing in such position as to be exposed at its exterior to gas in said casing and defining about the bushing an oil chamber, means biasing said bushing to cause said end face of said bushing to contact said face of said flange, an oil pressure source, at least one passageway connecting said oil pressure source to said oil chamber, at least one further passageway connecting said oil chamber to the faces of said bushing and said flange, whereby oil supplied under pressure by said source to said oil chamber will be effective to substantially reduce the force exerted by pressure of gas in said casing upon the exterior of said bellows and to cause oil to flow to the contacting faces of said bushing and said flange to effect an oil seal therebetween.

References Cited in the file of this patent
UNITED STATES PATENTS

| 2,036,308 | Vroom | Apr. 7, 1936 |
| 2,265,953 | Mortensen et al. | Dec. 9, 1941 |
| 2,326,824 | Browne et al. | Aug. 17, 1943 |
| 2,593,939 | Trist | Apr. 22, 1952 |
| 2,895,751 | Standish | July 21, 1959 |
| 3,051,497 | Wigg et al. | Aug. 28, 1962 |

FOREIGN PATENTS

| 690,569 | Great Britain | Apr. 22, 1953 |